June 16, 1925.
F. WEST
1,542,117
AIR BRAKE CONTROL APPARATUS
Filed Oct. 21, 1920
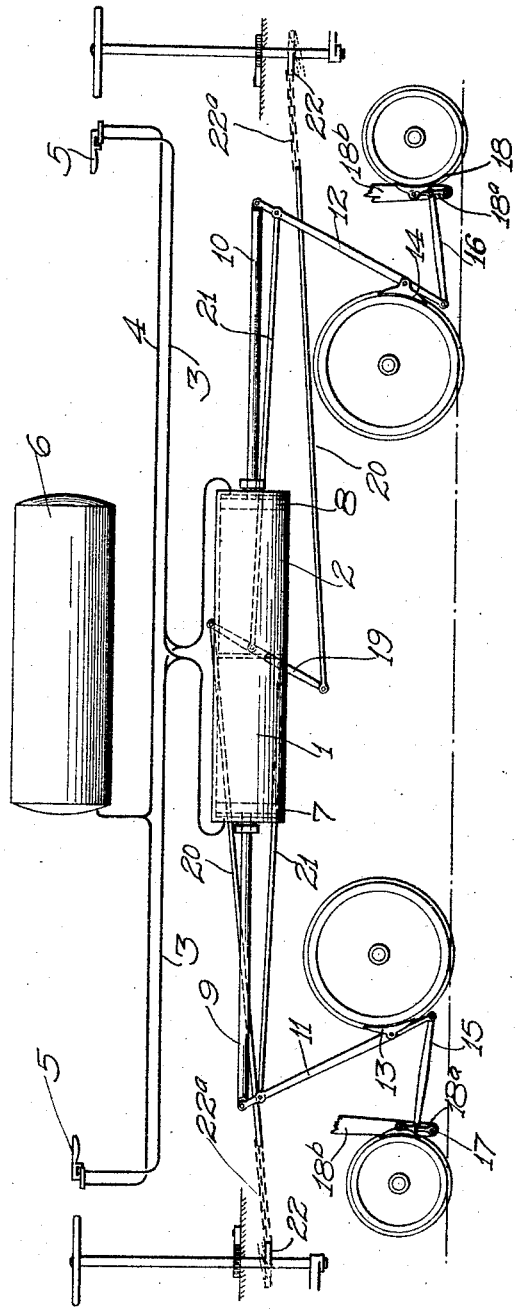
INVENTOR.
FRANK WEST.
BY A.B.Bowman
ATTORNEY

UNITED STATES PATENT OFFICE.

FRANK WEST, OF EAST SAN DIEGO, CALIFORNIA.

AIR-BRAKE-CONTROL APPARATUS.

Application filed October 21, 1920. Serial No. 418,405.

*To all whom it may concern:*

Be it known that I, FRANK WEST, a citizen of the United States, residing at East San Diego, in the county of San Diego and State of California, have invented a certain new and useful Air-Brake-Control Apparatus, of which the following is a specification.

My invention relates to an air brake control apparatus for street cars and the like and the objects of my invention are: first, to provide an air brake control apparatus which reduces to a minimum the liability of the apparatus to get out of order; second, to provide an apparatus of this class wherein the brake levers are operated directly by a brake operating air piston for each end of the car and independent of the leverage for the other end; third, to provide an apparatus of this class wherein two pistons and a compound cylinder is used instead of a single piston and cylinder and wherein each piston is connected with its particular brake mechanism; fourth, to provide an apparatus of this class wherein the leverage is increased so that the quantity of air required for the same amount of brake pressure is considerably reduced and fifth, to provide an apparatus of this class which is very simple and economical of construction, durable, easy to operate, safe, positive in its action, applicable for use in connection with the air systems now in use with but slight changes and which will not readily deteriorate or get out of order.

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which the figure is a side elevational view of my brake control apparatus showing certain portions diagrammatically to facilitate the illustration.

The cylinder 1, cylinder 2, conductor 3, conductor 4, controls 5, air tank 6, pistons 7 and 8, rods 9 and 10, levers 11 and 12, brake shoes 13 and 14, connecting rods 15 and 16, brake shoes 17 and 18, hand control lever 19, rods 20 and 21 constitute the principal parts and portions of my brake control apparatus.

The cylinders 1 and 2 are preferably formed in one cylindrical member with a cylinder in each end. Reciprocally mounted in the cylinder 1 is a piston 7 to which is secured a piston rod 9 and the other end of said piston rod 9 pivotally connects with the upper end of the lever 11. Reciprocably mounted in the cylinder 2 is a piston 8 to which is connected a piston rod 10, the other end of which pivotally connects with the upper end of a lever 12 and both of the rods 9 and 10 are provided with stuffing boxes to prevent leakage from the cylinders. These cylinders are connected at opposite ends by means of a common conductor 3 which is preferably a pipe which extends at its opposite ends and connects with the controls 5 at each end of the vehicle. These controls 5 also connect with a conductor 4 which connects with a compression tank 6 so that there is provided means for controlling the air from the compression tank to the opposite ends of the cylinders 1 and 2. Mounted on the levers 11 and 12 are the brake shoes 13 and 14 respectively, which are adapted to engage the wheels of the vehicle and pivotally connected to the lower end of the levers 11 and 12 are rods 15 and 16 which pivotally connect at their other ends with levers 18$^a$ which are pivotally mounted upon supports 18$^b$ and mounted on the ends of these levers 18$^a$ are brake shoes 17 and 18 which engage the front wheels of the vehicle. Thus it will be seen that when air is permitted to pass from the tank 6 to the cylinders 1 and 2, the pistons 7 and 8 are moved inwardly by pressure of the air causing the upper end of the lever 12 to move, engaging the shoes 13 and 14 with the intermediate wheels of the vehicle and the shoes 17 and 18 with the front and rear wheels of the vehicle; that the motion is direct without any loss of leverage as in the ordinary or conventional type of air brake control apparatus. In order to operate the same for emergency by hand, there is provided a lever 19 pivotally mounted in alinement with the position between the two cylinders. Pivotally connected to opposite ends of this lever 19 are rods 20, one at each end and their opposite ends connect with brake levers 22, one at each end of the vehicle by means of chains 22$^a$. Also pivotally connected to this lever 19 between its pivotal mounting and its ends are the rods 21, the other ends of which connect with the upper ends of the levers 11 and 12 so that the levers 11 and 12 are operated by hand by means of leverage through the lever 19 and directly. It will be noted that the brake linkage and operating levers as hereinbefore set forth operate, one end separately and independently of the other, so that in case of breakage of some of the parts, the whole brake system is not thrown out of order thus eliminating danger and providing an emergency brake at all times.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

Having thus described my invention what I claim as new and desire to secure by Letters Patent is:

1. An air brake control apparatus for vehicles, including a compressed air tank, a one piece compound cylinder, air conductors connecting said tank with the outer ends of the separate compartments in said cylinder, means for controlling the flow of air from said compressed air tank to said cylinder, a piston reciprocably mounted in each compartment of said cylinder adapted to be forced inwardly by the compressed air, a tension rod connected to each of said pistons and extending from the outer ends of said cylinder, a brake lever with one end connected to each of said tension rods connected with the other end of each of said levers and with the front and rear ends of said vehicle, and brake shoes connected with each of said levers and links.

2. An air brake control apparatus for vehicles, including a compressed air tank, a one piece compound cylinder provided with an inlet at the outer end of each compartment of said cylinder, air conductors connecting said tank with said air inlets, a piston reciprocably mounted in each of said compartments adapted to be forced inwardly by the air against the outer side of said piston, means for controlling the flow of air from said compressed air tank to said cylinder compartments, a tension rod secured to the outer side of each of said pistons and extending from the opposite ends of said cylinder compartments, a brake lever with one end connected to each of said tension rods connected with the other end of each of said levers and with the front and rear ends of said vehicle, brake shoes connected with each of said levers and links, and a manually operated lever means in connection with each brake lever, adjacent its connection with said tension rod, for operating said brake rods manually and independently of said pistons and cylinder.

3. In an air brake control apparatus for vehicles, a compressed air tank, a one-piece compound cylinder with a plain partition in the middle thereof, and air conductors connecting said tank with the outer ends of the separate compartments of said cylinder.

4. In an air brake control apparatus for vehicles, a compressed air tank, a one-piece compound cylinder with a plain partition in the middle thereof, air conductors connecting said tank with the outer ends of the separate compartments of said cylinder, means for controlling the flow of air from said compressed air tank to said cylinder, a piston reciprocably mounted in each compartment of said cylinder adapted to be forced inwardly by the compressed air, a tension rod connected to each of said pistons and extending from the outer ends of said cylinder, a brake lever with one end connected to each of said tension rods connected with the outer end of each of said levers and with the front and rear ends of said vehicle, brake shoes connected with each of said levers, and a manually operated lever means in connection with each brake lever adjacent its connection with said tension rod for operating said brake rods manually and independently of said pistons and cylinder.

In testimony whereof, I have hereunto set my hand at San Diego, California, this 13th day of October, 1920.

FRANK WEST.